(12) United States Patent
Ohtake et al.

(10) Patent No.: US 6,494,801 B1
(45) Date of Patent: Dec. 17, 2002

(54) CONTROL SYSTEM FOR HYBRID DRIVE UNIT

(75) Inventors: Masanori Ohtake, Susono (JP); Akira Murakami, Susono (JP); Shinichi Kojima, Susono (JP); Hisanori Nomoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 09/678,704

(22) Filed: Oct. 3, 2000

(30) Foreign Application Priority Data

Oct. 8, 1999 (JP) .......................... 11-288642

(51) Int. Cl.$^7$ ................................ F16H 3/72
(52) U.S. Cl. ................ 475/5; 475/127; 475/131; 475/134; 477/3
(58) Field of Search ............ 475/1, 5, 127, 475/130, 131, 132, 134, 135; 477/2, 3; 180/65.1, 65.2, 65.3, 65.4

(56) References Cited

U.S. PATENT DOCUMENTS

| | | | | |
|---|---|---|---|---|
| 3,650,161 A | * | 3/1972 | Ito et al. ................. | 475/132 X |
| 5,288,279 A | * | 2/1994 | Sakai et al. ............... | 475/127 |
| 5,730,675 A | * | 3/1998 | Yamaguchi ............... | 475/5 X |
| 5,846,155 A | * | 12/1998 | Taniguchi et al. ......... | 477/2 |
| 5,887,670 A | * | 3/1999 | Tabata et al. ............. | 180/65.2 |
| 6,019,699 A | * | 2/2000 | Hoshiya et al. ........... | 477/3 X |

FOREIGN PATENT DOCUMENTS

| | | |
|---|---|---|
| DE | 100 04 401 A 1 | 8/2000 |
| EP | 0 839 683 A2 | 5/1998 |
| EP | 0 937 600 A2 | 8/1999 |
| JP | 402292573 A * 12/1990 | ............ 475/116 |
| JP | 10-103507 | 4/1998 |
| JP | 10-246323 | 9/1998 |

OTHER PUBLICATIONS

EPO Search Report dated Mar. 7, 2002 for EP 00 12 1876.

* cited by examiner

Primary Examiner—Sherry Estremsky
Assistant Examiner—Ha Ho
(74) Attorney, Agent, or Firm—Kenyon & Kenyon

(57) ABSTRACT

In a control system for a hybrid drive unit, in accordance with applied/released states of engagement elements, there can be set: a forward running range for a forward run by transmitting an input torque to an output member, a backward running range for a backward run by transmitting an input torque to the output member, and a stop range capable of driving one of the power sources by the other. The control system includes a range switching valve activated in response to the individual set ranges for switching and outputting an initial pressure for applying the engagement elements, to a plurality of passages, and adapted, when the stop range is set, to output the hydraulic pressure to the engagement element for establishing a torque transmission passage from one of the power sources to the other and to block the feed of the initial pressure to the engagement element for establishing, when applied, the torque at the output member.

12 Claims, 3 Drawing Sheets

FIG.3

| RANGES | RUNNING MODES | C1 | C2 | B1 |
|---|---|---|---|---|
| B, D | ETC MODE | X | O | X |
| | DIRECT-COUPLED MODE | O | O | X |
| | MOTOR DRIVE MODE | O | X | X |
| N, P | NEUTRAL | X | X | X |
| | CHARGING MODE | X | X | O |
| | ENGINE START (EXTREMELY COLD) | X | X | O |
| R | MOTOR DRIVE MODE | O | X | X |
| | R-FRICTION RUNNING MODE | O | X | O |

O: APPLIED  X: RELEASED

CONTROL SYSTEM FOR HYBRID DRIVE UNIT

BACKGROUND OF THE INVENTION

1. Field of the Invention

The present invention relates to a hybrid drive unit for transmitting torques from a plurality of power sources including an internal combustion engine and an electric motor to an output member such as an output shaft and, more particularly, to a control system for controlling the applications/releases of engagement elements of a hybrid drive unit which is constructed such that torque transmission lines from the power sources to the output shaft are changed by the applications/releases of the engagement elements such as clutches or brakes to be applied by a hydraulic pressure.

2. Related Art

A hybrid vehicle using an internal combustion engine such as a gasoline engine and an electric motor as power sources and having an electric generator mounted thereon has been developed and practiced as a vehicle which is enabled to reduce the exhaust gas (i.e. emission) and improve the fuel consumption by running the internal combustion engine efficiently and by regenerating the energy. The hybrid vehicle of this kind is basically constructed to effect the efficient run by changing the power sources to be used on the basis of the running state. In order to reduce the size and improve the power performance, however, it has been widely tried to use a transmission together.

As this transmission, there have been a variety of constructions including not only an ordinary transmission for changing the gear ratio discontinuously or continuously but also a construction in which the torque of the internal combustion engine and the torque of the electric motor are synthesized and outputted, a construction in which the torque of the internal combustion engine is amplified and outputted, and a construction in which a reverse step is set. By using these transmissions together, the torque transmission lines can be made more various to set drive states for satisfying the various demands. In this case, too, it is necessary to reduce the size and weight of the entire system. Therefore, the construction may be modified such that the engagement elements for holding the torque transmission lines are applied both for the forward run and for the backward run, or such that the valves for feeding application pressure such as oil pressures to predetermined engagement elements are applied both for the forward run and for the regeneration of the energy. In short, the engagement elements and the valves for controlling the elements are used in different drive states. As a result, the drive state of the vehicle may be inverted, when the control valves are inverted from the intrinsic action state by some disorder or when the applied states of the engagement elements become different from the intrinsic states.

In order to prevent this inversion of the drive states, as might accompany the so-called "failure", the invention, as described in Japanese Patent Laid-Open No. 10-103507, is constructed such that the oil pressure is drained when a valve sticks during the forward run or during the backward run. Specifically, the front shift valve is constructed to be switched between the position where the oil pressure is fed to the front clutch and drained from the rear clutch and the position where the front clutch is blocked from the line pressure, and the rear shift valve is constructed to be switched between the position where the oil pressure is fed to the rear clutch and drained from the front clutch and the position where the rear clutch is blocked from the line pressure. When each shift valve sticks into the state in which the oil pressure is fed to each of the front and rear clutches, therefore, the oil pressure is drained individually from the front and rear clutches so that a neutral state is established to avoid the trouble due to the valve stick.

The invention, as described in the aforementioned Laid-Open, provides the construction for establishing the fail-safe in the case where the control for the backward run by inverting the torque outputted from the engine and transmitting it to the output side and the control for the forward run by transmitting the torque outputted from the engine to the output side without inverting are simultaneously caused by the valve stick. In the hybrid vehicles, however, the situations for the fail-safe to be established are more various because the powers are inputted from the plurality of power source to the gear mechanism of the transmission, or because in the hybrid vehicle using an internal combustion engine and a motor/generator as the power sources, the power generation and the power charge may be performed by driving the motor/generator by the internal combustion engine. Specifically, this so-called "charging mode" is executed not depending on whether the vehicle is running or not but on the charging state of the battery, and the vehicle may run, even during the stop, if the failure is caused by the valve stick or the like. This is a situation peculiar to the hybrid vehicle and cannot be solved by the construction for the fail-safe which is directed to the vehicular transmission using only the engine as the power source, as described in the Laid-Open.

SUMMARY OF THE INVENTION

A main object of the invention is to provide a control system for a hybrid control unit for avoiding it in advance that drive state is made different from the intended one by a trouble in a control system of a hydraulic pressure to apply engagement elements.

Another object of the invention is to provide a control system for a hybrid drive unit, which is constructed such that the feed passages of a hydraulic pressure to a plurality of engagement elements for establishing a predetermined drive state are selected by a manually operable switching valve.

According to the invention, there is provided a control system for a hybrid drive unit, comprising: a gear mechanism having different rotary members connected to a plurality of power sources; and a plurality of engagement elements adapted to be applied by a hydraulic pressure for coupling the rotary members to each other in the gear mechanism and for stopping rotations of a predetermined rotary member, wherein in accordance with the applied/released states of the engagement elements, there can be set: a forward running range for a forward run by inputting an input torque to an output member; a backward running range for a backward run by transmitting an input torque to the output member; and a stop range capable of driving one of the power sources by the other. The control system further comprises a range switching valve activated in response to the individual set ranges for switching and outputting an initial pressure for applying the engagement elements, to a plurality of passages, and adapted, when the stop range is set, to output a hydraulic pressure to the engagement element for establishing a torque transmission passage from one of the power sources to the other and to block the feed of the initial pressure to the engagement element for establishing, when applied, the torque at the output member.

Therefore, the individual engagement elements are fed with the initial pressure for applications in accordance with the range, as set, from the range switching valve. With the stop range being set, moreover, when one power source is to be driven by another in the stop range, the engagement elements are so applied as to transmit the torque between those power sources. At this time, even if any trouble occurs in the feed line of the hydraulic pressure to the engagement element which will generate, if applied, the torque at the output member to invite the situation in which the hydraulic pressure is applied to the engagement element, the output of the initial pressure for the application to the troubled engagement element is blocked by the range switching valve for outputting the initial pressure, so that the engagement element is kept in the released state. In short, it is possible to avoid it in advance that the torque is generated at the output member with the stop range being set.

According to the invention, on the other hand, there can be provided a control system for a hybrid drive unit, wherein the torques outputted by an internal combustion engine and an electric motor are selectively transmitted in accordance with a selected one of a forward running range, a stop range and a backward running range through a planetary gear mechanism to an output member. The control system can further comprise: a first engagement element adapted to be applied by a hydraulic pressure for establishing a forward running state by coupling the rotary elements of the planetary gear mechanism or the rotary elements and another member; a second engagement element adapted to be applied by a hydraulic pressure with the first engagement element being applied, for establishing a reverse running state by coupling the rotary elements of the planetary gear mechanism or the rotary elements and another member; and a range switching valve adapted to be activated in response to each of the ranges and including a plurality of output ports for outputting the initial pressure of the hydraulic pressure in accordance with the range selected, and for opening the output port leading to the first engagement element and dosing the output port leading to the second engagement element, when the forward running range is selected.

In the control system, therefore, the forward running state is established when the first engagement element is applied, and the reverse state is established when both the first engagement element and the second engagement element are applied, so that the drive state is reversed depending upon whether or not the second engagement element is applied. With the forward running range is selected, on the contrary, the range switching valve closes the output port leading to the second engagement element but opens the output port leading to the first engagement element. In the forward running range, therefore, the feed of the hydraulic pressure to the second engagement element is prevented by the range switching valve for controlling the feed of the initial pressure. As a result, it is possible to prevent it in advance that the reverse state is established despite that the forward running range is selected.

According to the invention, moreover, there can be provided a control system for a hybrid drive unit, wherein an internal combustion engine is connected to any of three rotary elements constructing a planetary gear mechanism whereas an electric generator is connected to another of the rotary elements, so that the torque is selectively outputted in accordance with a selected one of a forward running range, a stop range and a backward running range, through the planetary gear mechanism to an output member. The control system can comprise: a first engagement element adapted to be applied by a hydraulic pressure for selectively connecting the output member and any of the rotary elements of the planetary gear mechanism; a second engagement element adapted to be applied by a hydraulic pressure for bringing the torque of the internal combustion engine into a state where the torque can be transmitted to the electric generator; and a range switching valve adapted to be activated in response to each of the ranges and including a plurality of output ports for outputting the initial pressure of the hydraulic pressure in accordance with the range selected, and for closing the output port leading to the first engagement element and opening the output port leading to the second engagement element, when the stop range is selected.

In this control system, therefore, with the drive range being selected, the first engagement element is applied so that the torque can be transmitted to the output member to effect the forward run or the backward run. With the stop range being selected, on the other hand, the output port leading to the first engagement element in the range switching valve is closed to open the first engagement element, but the output port leading to the second engagement element is opened to apply the second engagement element. As a result, the torque of the internal combustion engine can be transmitted to the electric generator to generate the electric power. In short, the vehicle can be reliably prevented from running even if the internal combustion engine is activated, while generating the electric power.

According to the invention, moreover, there can be provided a control system for a hybrid drive unit, wherein the torques outputted by an internal combustion engine and an electric motor are selectively transmitted in accordance with a selected one of a forward running range, a stop range and a backward running range through a planetary gear mechanism to an output member. The control system can comprise: a first engagement element adapted to be applied by a hydraulic pressure for establishing a forward running state by coupling the rotary elements of the planetary gear mechanism or the rotary elements and another member; a second engagement element adapted to be applied by a hydraulic pressure with the first engagement element being applied, for establishing a reverse running state by coupling the rotary elements of the planetary gear mechanism or the rotary elements and another member; and a range switching valve adapted to be activated in response to each of the ranges for outputting an initial pressure of the hydraulic pressure and for closing a predetermined output port leading to the first engagement element, opening a port for outputting the hydraulic pressure to the second engagement element, and opening another port for feeding a portion of the hydraulic pressure, as outputted from the port, to the first engagement element.

In this control system, therefore, the forward running state is established by applying the first engagement element, and the backward running state is established by applying the first engagement element and the second engagement element. When the reverse range is selected, moreover, the first engagement element is fed via another port of the range switching valve with a portion of the hydraulic pressure to be fed from the range switching valve to the second engagement element. In the reverse range, specifically, the hydraulic pressure is not fed to the first engagement element before there is established the feed state of the hydraulic pressure for applying the second engagement element. The reverse range does not come into the feed state of the hydraulic pressure for establishing the forward running state.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a table enumerating the ranges, which can be selected by the power transmission shown in FIG. 2, and the running modes to be set for the individual ranges.

DETAILED DESCRIPTION OF THE PREFERRED EMBODIMENTS

Figure 2:
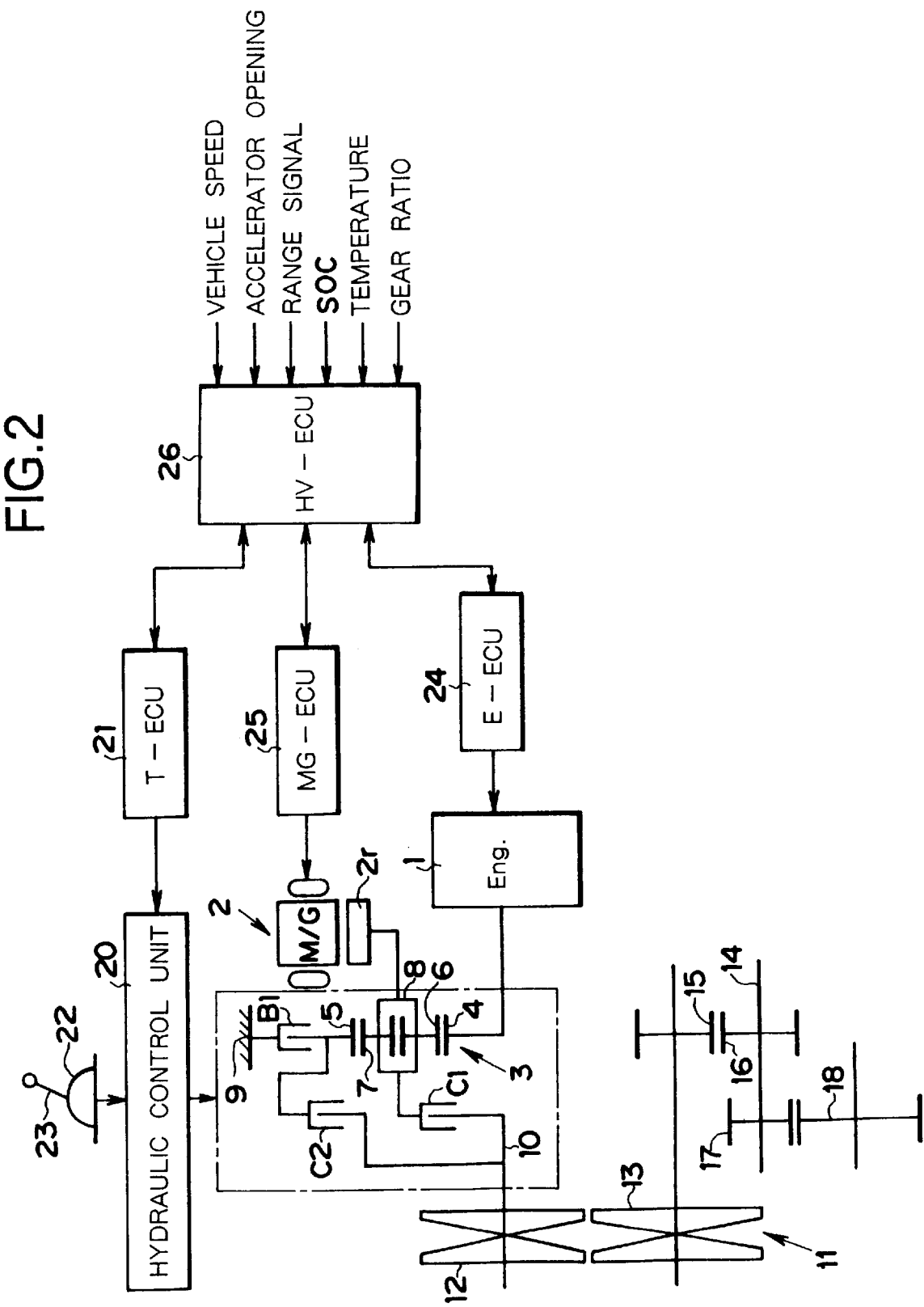
FIG. 2 is a skeleton diagram schematical showing one example of a power transmission to which the invention is applied.

The invention will be described in connection with its specific embodiments with reference to the accompanying drawings. First of all, one example of a hybrid drive unit, to which the invention can be applied, is shown in FIG. 2. The example shown in FIG. 2 is constructed such that the powers of an internal combustion engine 1 acting as a first power source and an electric motor 2 acting as a second power source are outputted individually or synthetically. The internal combustion engine 1 is a power unit such as a gasoline engine or a Diesel engine capable of outputting the power by burning a fuel. This internal combustion engine will be shortly referred to as the "engine (or Eng.) 1".

On the other hand, the electric motor 2 is, in short, a power unit which rotates and outputs the power when fed with an electric current. The electric motor 2 is exemplified by motors of various types including the synchronous type, and by an electric motor having a power generating function. The electric motor will be modified by one having the power generating function and will be referred to as the "motor/generator (M/G) 2".

A double pinion type planetary gear mechanism 3 is provided as a unit for outputting the powers of those engine 1 and the motor/generator 2 individually or synthetically. This planetary gear mechanism 3 has the well-known construction including rotary elements: a sun gear 4 or an external gear; a ring gear 5 or an internal gear arranged concentrically with the sun gear 4; and a carrier 8 retaining a first pinion gear 6 meshing with the sun gear 4 and a second pinion gear 7 meshing with the first pinion gear 6 and the ring gear 5 so that the first and second pinion gears 6 and 7 may rotate on their respective axes and around the carrier 8, thereby to cause the differential actions among those three rotary elements.

To the sun gear 4 of the rotary elements, there is connected the output shaft (e.g., the crankshaft) of the engine 1. When a reciprocating engine is employed as the engine 1, torque fluctuations or vibrations are caused by the intermittent combustion of the fuel. In order to absorb or damp the vibrations, a (not-shown) damper mechanism may be interposed between the engine 1 and the sun gear 4. In this case, the torsional characteristics of the damper mechanism are set by considering the resonances between the engine 1 and the motor/generator 2. To the carrier 8, on the other hand, there is connected a rotor 2r of the motor/generator 2.

Between the ring gear 5 and a casing 9, moreover, there is interposed a brake B1. This brake B1 fixes the ring gear 5 selectively and can be exemplified by a frictional engagement type unit such as a multi-disc brake or a band brake interposed between the ring gear 5 and the casing 9.

An output shaft 10 acting as the output member is arranged in alignment with the engine 1. As the coupling means for transmitting the power selectively to the output shaft 10, there are provided two clutches: a first clutch C1 for coupling the carrier 8 and the output shaft 10 selectively; and a second clutch C2 for coupling the ring gear 5 and the output shaft 10 selectively. These clutches C1 and C2 can be exemplified by the multi-disc type for hydraulically applying/releasing the couplings but also by the various types such as the positive type clutches.

Figure 1:
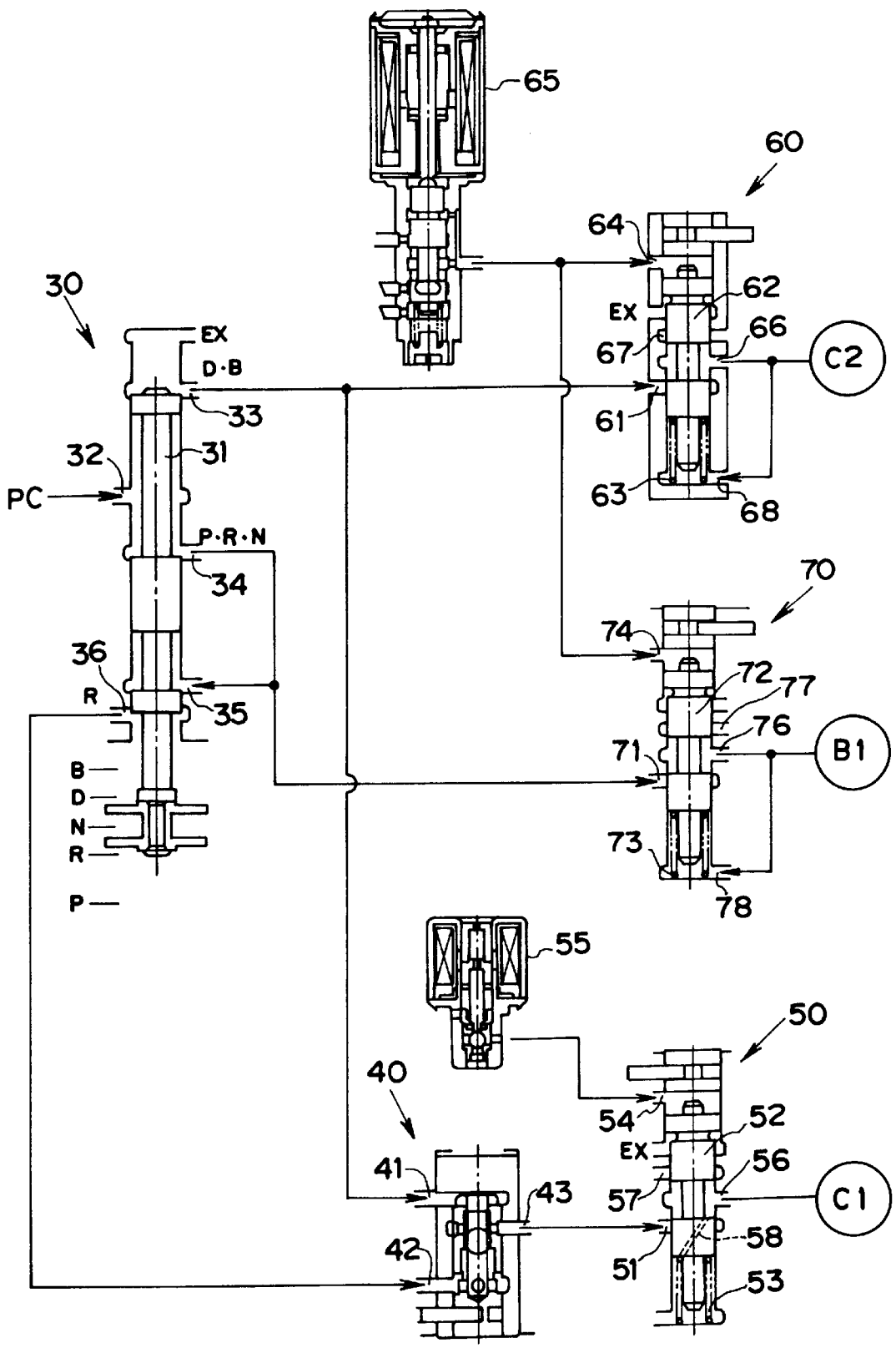
FIG. 1 is a circuit diagram showing a portion of one example of a hydraulic circuit belonging to a control system of the invention.

The output shaft 10 is connected to a transmission 11. This transmission 11 is provided for changing the gear ratio to increase/decrease the driving torque. The transmission 11 can be exemplified by the various transmissions including: the discontinuous type transmission constructed mainly of the planetary gear mechanism; the discontinuous type transmission for changing the coupling relations of the rotary elements by a synchronous switching mechanism (e.g., a synchronizer); the belt type continuously variable transmission; and the toroidal type continuously variable transmission. Of these, the belt type continuously variable transmission 11 is schematically shown in FIG. 1.

This continuously variable transmission 11 is of the known construction in which a drive pulley (primary pulley) 12 and a driven pulley (secondary pulley) 13 capable changing their groove widths are arranged in parallel and in which a (not-shown) belt is made to run on those pulleys 12 and 13. Thus, the transmission 11 is enabled to vary the gear ratio continuously by changing the groove widths of the pulleys 12 and 13 to change the winding radii of the belt (or the pulley's effective radii) with respect to the pulleys 12 and 13.

A counter shaft 14 is arranged in parallel with the driven pulley 13, and these driven pulley 13 and counter shaft 14 are connected by a pair of counter gears 15 and 16. On the other hand, another gear 17 mounted on the counter shaft 14 is meshed with an output gear 18. This output gear 18 is the ring gear of a differential unit (not-shown), for example.

The planetary gear mechanism 3 thus far described also performs a differential action so that a variety of running modes can be selected by utilizing the function of the planetary gear mechanism 3. These various running modes are set by applying the aforementioned brake B1 and clutches C1 and C2 selectively. For this control, there are provided: a hydraulic control unit 20; an electronic control unit (T-ECU) 21 for outputting control signals to the hydraulic control unit 20; and a shift unit 22 for switching the oil passages of the hydraulic control unit 20. This hydraulic control unit 20 is constructed mainly of various change-over valves or pressure regulating valves and a solenoid valve or the like for outputting control signal pressures. On the other hand, the electronic control unit 21 is constructed to perform calculations on the basis of various data inputted, and to output instruction signals to the solenoid valve of the hydraulic control unit 20 on the basis of the calculation results thereby to set a predetermined running mode. Moreover, the shift unit 22 is constructed to select a range (or position) corresponding to each of the running modes by means of a shift lever 23.

These ranges include parking (P), reverse (R), neutral (N), drive (D) and brake (B) ranges. Of these ranges, the parking range and the neutral range are provided to keep the vehicle in the stop state without applying the individual clutches C1 and C2. On the other hand, the drive range and the brake range are provided for the forward run, and the brake B1 is not activated (or applied). Moreover, the reverse (R) range is provided for the backward run, in which the first clutch C1 is activated (or applied) to use the carrier 8 as an output element. In response to these individual ranges, moreover, there are set the running modes, as will be described hereinafter.

In response to each running mode, on the other hand, the engine 1 and the motor/generator 2 have to be activated/inactivated. For these actions, there are provided electronic control units (E-ECU and MG-ECU) 24 and 25, respectively, for the engine 1 and the motor/generator 2. Each of the aforementioned electronic control units 21, 24 and 25 is constructed mainly of an arithmetic processing unit (CPU or MPU), storage units (RAM and ROM) and an input/output interface so that they may perform calculations according to the data inputted and the program stored in advance, to output signals according to the calculation results. Moreover, the individual electronic control units 21, 24 and 25 are connected with a hybrid control unit (HV-ECU) 26 or a similar electronic control unit in a data communication manner. This hybrid control unit 26 is constructed to judge the running mode thereby to output the control signals to the individual electronic control units 21, 24 and 25. The data to be used in these electronic control units 21, 24 and 25 and in the hybrid control unit 26 are exemplified by: the vehicle speed; the accelerator opening (or the depression of the not-shown accelerator pedal); the range signal selected by the shift unit 22; the state of charge (i.e., SOC) of the (not-shown) battery for charging/discharging the motor/generator 2; the battery temperature; and the gear ratio set in the transmission 11.

Here will be described the running modes which are set to correspond to the individual ranges, as tabulated in FIG. 3. In the drive (D) range and the brake (B) range, the ETC mode, the direct-coupled mode and the motor drive mode are set. Of these, the ETC mode is set when a relatively high driving force is demanded. In the ETC mode, the output torque of the engine 1 is amplified by the planetary gear mechanism 3 and the motor/generator 2 before it is outputted. In this mode, therefore, only the second clutch C2 is applied. Specifically: the torque of the engine 1 is inputted to the sun gear 4 of the planetary gear mechanism 3 to cause the sun gear to act as an input element; the motor/generator 2 is coupled to the carrier 8 to cause the carrier 8 to act as a reaction element; and the ring gear 5 is connected through the second clutch C2 to the output shaft 10 to act as the output element. In this case, when the torque is inputted from the engine 1 to the sun gear 4, the carrier 8 rotates in the opposite direction of the sun gear 4. When the reaction torque in the rotational direction of the engine 1 is inputted to the carrier 8 by the motor/generator 2, however, there is generated such a torque at the ring gear 5 acting as the output element as is amplified at the gear ratio (i.e., the ratio of the sun gear tooth number to the ring gear tooth number) of the planetary gear mechanism 3 from the torque inputted from the engine 1. As a result, the high driving force can be achieved.

In the direct-coupled mode, the vehicle is driven mainly by the engine 1 with the planetary gear mechanism 3 being directly coupled in its entirety. As a result, both the clutches C1 and C2 are controlled into the applied state (or into the engaging state). As a result, the two rotary elements of the planetary gear mechanism 3, i.e., the carrier 8 and the ring gear 5 are integrally connected so that the planetary gear mechanism 3 is integrated in its entirety. As a result, the torque is transmitted, as it is outputted from the engine 1, to the output shaft 10. Therefore, this running mode is set at a cruising speed under a relatively low load with a high running efficiency of the engine 1. In this case, the motor/generator 2 is activated to raise the driving torque or can be driven by the torque of the engine 1 to generate the electric power.

In the motor drive mode, the vehicle is driven exclusively by the motor/generator 2 so that the only the first clutch C1 is applied (into the engaging state) so that the motor/generator 2 is directly coupled to the output shaft 10. This motor drive mode is set at a starting time because the output torque of the motor/generator 2 can be controlled irrespective of its speed.

Therefore, the vehicle is started, when driven, in the motor drive mode. After this, the engine 1 is started, and the motor drive mode is switched into the direct-coupled mode when the speeds of the engine 1 and the motor/generator 2 become substantially equal. When the accelerator pedal is deeply depressed to raise a demand driving force either at the starting time or while the vehicle is being driven in the direct-coupled mode, the ETC mode is set to assist the driving force of the engine 1 with the output of the motor/generator 2. In any of these running modes, on the other hand, the motor/generator 2 and the output shaft 10 are coupled in the torque transmitting manner so that the motor/generator 2 can be driven at a decelerating time by the running inertia of the vehicle to regenerate the energy.

In the stop range such as the neutral (N) range or the parking (P) range, there are set the individual drive states including the neutral state, the charging mode and the engine start at an extremely low temperature. In the neutral state, the planetary gear mechanism 3 does not perform the function to transmit the power so that the individual clutches C1 and C2 and the brake B1 are released.

In the charging mode, on the other hand, the power is not transmitted to the output shaft 10, and the motor/generator 2 is driven by the engine 1 so that only the brake B1 is applied. With the ring gear 5 of the planetary gear mechanism 3 being fixed, therefore, the sun gear 4 is rotated by the engine 1 so that the carrier 8 acts as the output element and rotates in the opposite direction of the sun gear 4. In short, the motor/generator 2 is driven by the engine 1 in the opposite direction of the engine 1 so that the motor/generator 2 performs the power generating action.

For starting the engine 1 at an extremely low temperature, moreover, a high torque is required so that the engine 1 is driven and started by the motor/generator 2. This is contrary to the aforementioned charging mode in the power inputting/outputting state. With only the brake B1 being applied to fix the ring gear 5, more specifically, the motor/generator 2 is driven backward of the engine 1. As a result, the carrier 8 rotates backward so that the sun gear 4 and the engine 1 connected thereto are rotated forward to start the engine 1.

The reverse (R) range is provided for driving the vehicle backward. Either the motor/generator 2 or the engine 1 can be employed as the power source for effecting the reverse range. In short, the motor drive mode can be established, and only the first clutch C1 is applied to couple the motor/generator 2 to the output shaft 10 directly. In this state, the motor/generator 2 is rotated backward to rotate the output shaft 10 in the reverse direction. In this case, the output torque of the motor/generator 2 can be controlled irrespective of the speed so that the vehicle can be started backward with the first clutch C1 being completely applied.

When the vehicle is driven backward by the engine 1, on the other hand, the backward start is made without shocks by causing the reverse function in the planetary gear mechanism 3 and by increasing the transmission torque at the brake B1 gradually. In short, the friction running mode is established. Specifically, the brake B1 is applied to fix the ring gear 5, and the first clutch C1 is applied (engaged) to cause the carrier 8 to act as the output element. When the sun gear 4 is rotated forward in this state by the engine 1, the carrier 8 rotates backward (for the reverse run). When the engine 1 is to be started, however, the load from the output shaft 10 cannot be applied to the engine 1. If the brake B1 is applied simultaneously as the vehicle is driven backward from the neutral state, moreover, the torque of the output shaft 10 abruptly rises to cause shocks. When the reverse run is caused by the power of the engine 1, therefore, the brake B1 is released to apply no reaction torque to the ring gear 5 thereby to reduce the torque of the output shaft 10 to zero. From this state, the brake B1 is gradually applied to increase the reaction torque of the ring gear 5 gradually. In short, the brake B1 is gradually brought from the released state through a slip state into the complete engagement. Thus, the torque of the output shaft 10 rises gradually from the zero so that the vehicle can be smoothly started.

In the hybrid drive unit thus far described, one engagement element plays a plurality of functions because the number of components is made as small as possible. When the applied/released states of any of the engagement elements fail to change, therefore, the drive states become widely different. If the brake B1 is applied in the drive (D) range for the forward run or in the brake (B) range, the drive unit is wholly locked or brought into the reverse running state. If the first clutch C1 is applied at the charging time in the neutral (N) range or the parking (P) range for the stop range, on the other hand, the backward torque is established at the output shaft 10 to establish the reverse run. If the first clutch C1 is applied at a coasting run in the neutral state, moreover, the locked state is established because the motor/generator 2 stops. If the second clutch C2 is applied in the reverse (R) range, still moreover, the locked state or the forward running state is established.

In order to prevent the drive state contrary or contradictory to the intended one in advance by a mechanical construction, the hydraulic circuit forming a part of the control unit of the hybrid drive unit thus far described is constructed in the following manners. FIG. 1 shows one example of this construction, in which an initial application pressure for the individual engagement elements is fed/blocked by a manual valve to be switched according to the range selected. This manual valve, as designated by reference numeral 30 in FIG. 1, is constructed such that a spool 31 is moved back and forth in the axial direction by the shift lever 23 of the aforementioned shift unit 22. Specifically, this manual valve 30 is constructed to move the spool 31 to each of the P (parking), R (reverse), N (neutral), D (drive) and B (brake) positions in accordance with the shift position (or range) which can be selected by the shift unit 22. The manual valve 30 is further constructed to output the initial pressure (or the range pressure) for applying the brake B1 and the individual dutches C1 and C2 in accordance with those individual positions.

At a central portion in the axial direction, more specifically, there is formed an input port 32 to which a line pressure (PC) regulated as the initial application pressure for the engagement elements is inputted. At the D-position and the B-position, the input port 32 is opened to a first output port 33 to output a D-range pressure and a B-range pressure. At the N-position, the R-position and the P-position, on the other hand, the input port 32 is opened to a second output port 34 to output the N-range pressure, the R-range pressure and the P-range pressure. There is formed a second input port 35 which is always opened to the second output port 34. At the R-position, the second input port 35 is opened to a third output port 36, from which the R-range pressure when the R-position is selected is outputted.

The first output port 33 and the third output port 36 in this manual valve 30 are connected with different input ports 41 and 42 in a shuttle valve 40. This shuttle valve 40 is constructed to open an output port 43 but to close the input port to which the lower oil pressure is applied, when its moving member is moved by the oil pressure applied to either of the input ports 41 and 42. Accordingly, the shuttle valve 40 outputs any of the D-range pressure, the B-range pressure and the R-range pressure. The output port 43 is connected with the input port 51 of a C1 control valve 50 for controlling the application pressure of the first clutch C1.

This C1 control valve 50 is a regulator valve for outputting the oil pressure according to the axial force to act on a spool 52, i.e., a pressure regulation level. A spring 53 is arranged on one end side of the spool 52. On the other side opposite of the spring 53, there is formed a signal pressure port 54, which is connected with a solenoid valve 55 having its duty controlled to output an oil pressure according to the duty ratio. At the central portion in the axial direction, on the other hand, there is formed an output port 56 which is opened irrespective of the location of the spool 52. The input port 51 is formed on the side of the spring 53 with respect to the output port 56, and a drain port 57 is formed on the side of the signal pressure port 54 on the opposite side. Moreover, the output port 56 is connected with the (not-shown) servo oil chamber of the first dutch C1. In the land abutting against the spring 53, moreover, there is formed a communication hole 58 which extends therethrough in the axial direction to the both end portions thereby to apply the oil pressure of the output port 56 as a feedback pressure to the end portion at the spring 53.

As the input port 51 and the output port 56 communicate with each other so that the oil pressure is fed to the first clutch C1 to raise its application pressure gradually, the force for pushing the spring 52 together with the spring 53 exceeds the axial force based on the oil pressure of the solenoid valve 55 applied to the signal pressure port 54. As a result, the input port 51 is closed, but the drain port 57 is opened by the spool 52 so that the output port 56 is opened to the drain port 57. Moreover, the oil pressure of the first clutch C1 and the oil pressure on the end side having the spring 53 arranged go down, the spool 52 moves in the direction to compress the spring 53 thereby to close the drain port 57, and the input port 51 and the output port 56 restore their communication so that the oil pressure is fed to the first clutch C1. In short, as the oil pressure (or the signal pressure) to be applied to the signal pressure port 54 is the higher, the oil pressure to be outputted becomes the higher. During this pressure regulation, on the other hand, the oil pressure is discharged from the drain port 57. In other words, the pressure regulation is performed by opening the output port 56 selectively into the input port 51 and the drain port 57.

Here, the solenoid valve 55 thus far described of the so-called "normal closing type" for stopping the output of the oil pressure (or the signal pressure) when in the deenergized OFF state. If this solenoid valve 55 fails when deenergized by a disconnection or the like, therefore, no oil pressure is fed to the signal pressure port 54 of the C1 control valve 50 so that the input port 51 is closed to output no oil pressure fed thereto.

With the first output port 33 of the aforementioned manual valve 30, on the other hand, there is connected an input port 61 of a C2 control valve 60 for controlling the application pressure of the second clutch C2. This C2 control valve 60 is a pressure regulator valve like the aforementioned C1 control valve 50 for outputting an oil pressure according to the axial force to act on a spool 62, i.e., the pressure regulation level. A spring 63 is arranged on one end side of the spool 62, and a signal pressure port 64 is formed on the opposite side of the spring 63. With the signal pressure port 64, there is connected a linear solenoid valve 65 for outputting an oil pressure according to the voltage. On the other hand, an output port 66, as opened irrespective of the location of the spool 62, is formed at the central portion in the axial direction. The input port 61 is formed on the side of the spring 63 with respect to the output port 66, and a drain port 67 is formed on the side of the signal pressure port 64 on the opposite side of the input port 61. Moreover, the output port 66 is connected with the (not-shown) servo oil chamber of the second clutch C2, whereas the output port 66 is opened to a feedback port 68 which is formed in the end portion accommodating the spring 63.

As the input port 61 and the output port 66 communicate to feed the oil pressure to the second clutch C2 thereby to raise its application pressure gradually, the force to push the spool 62 together with the spring 63 exceeds the axial force which is based on the oil pressure of the linear solenoid valve 65 applied to the signal pressure port 64. As a result, the input port 61 is closed by the spool 62, and the drain port 67 is opened to open the output port 66 to the drain port 67. Moreover, the oil pressure of the second clutch C2 and the oil pressure on the end portion side having the spring 63 arranged go down so that the spool 62 moves in the direction to compress the spring 63 thereby to close the drain port 67, and the input port 61 and the output port 66 restore the communication so that the oil pressure is fed to the second clutch C2. In short, as the oil pressure (or the signal pressure) to be applied to the signal pressure port 64 is the higher, the oil pressure to be outputted becomes the higher. During this pressure regulation, on the other hand, the oil pressure is discharged from the drain port 67. In other words, the pressure regulation is performed by opening the output port 66 selectively into the input port 61 and the drain port 67.

Here, the linear solenoid valve 65 thus far described is of the so-called "normal opening type" for outputting the oil pressure (or the signal pressure) when in the deenergized OFF state. If this linear solenoid valve 65 fails when deenergized by a disconnection or the like, therefore, the oil pressure is fed to the signal pressure port 64 of the C2 control valve 60 so that the input port 61 is opened to the output port 66 to feed the application pressure to the second clutch C2.

Moreover, the second output port 34 of the manual valve 30 is connected with an input port 71 of a B1 control valve 70 for controlling the application pressure of the brake B1. This B1 control valve 70 is a pressure regulator valve like the aforementioned C2 control valve 60 for outputting an oil pressure according to the axial force to act on a spool 72, i.e., the pressure regulation level. A spring 73 is arranged on one end side of the spool 72, and a signal pressure port 74 is formed on the opposite side of the spring 73. With the signal pressure port 74, there is connected the aforementioned linear solenoid valve 65. On the other hand, an output port 76, as opened irrespective of the location of the spool 72, is formed at the central portion in the axial direction. The input port 71 is formed on the side of the spring 73 with respect to the output port 76, and a drain port 77 is formed on the side of the signal pressure port 74 on the opposite side of the input port 71. Moreover, the output port 76 is connected with the (not-shown) servo oil chamber of the brake B1, whereas the output port 76 is opened to a feedback port 78 which is formed in the end portion accommodating the spring 73.

As the input port 71 and the output port 76 communicate to feed the oil pressure to the brake B1 thereby to raise its application pressure gradually, the force to push the spool 72 together with the spring 73 exceeds the axial force which is based on the oil pressure of the linear solenoid valve 65 applied to the signal pressure port 74. As a result, the input port 71 is closed by the spool 72, and the drain port 77 is opened to open the output port 76 to the drain port 77. As a result, the oil pressure of the brake B1 and the oil pressure in the feedback port 78 go down so that the spool 72 moves in the direction to compress the spring 73 thereby to close the drain port 77, and the input port 71 and the output port 76 restore the communication so that the oil pressure is fed to the brake B1. In short, as the oil pressure (or the signal pressure) to be applied to the signal pressure port 74 is the higher, the oil pressure to be outputted becomes the higher. During this pressure regulation, on the other hand, the oil pressure is discharged from the drain port 77. In other words, the pressure regulation is performed by opening the output port 76 selectively to the input port 71 and the drain port 77.

Here, the aforementioned linear solenoid valve 65 is of the normal opening type, as described hereinbefore. If this linear solenoid valve 65 fails when deenergized by a disconnection or the like, therefore, the oil pressure is fed to the signal pressure port 74 of the B1 control valve 70 so that the input port 71 is opened to the output port 76 to feed the application pressure to the brake B1.

Here will be described the actions of the hydraulic circuit shown in FIG. 1, at first on the case in which the parking (P) range or the neutral range (N), i.e., the stop range is selected. When any of these ranges is selected, the spool 31 of the manual valve 30 is moved to the position corresponding to the range selected. FIG. 1 shows the location of the spool 31 when the neutral (N) range is selected, and the input port 32 is opened only to the second output port 34. This is similar in the parking (P) range. In this case, on the other hand, the first output port 33 is blocked from the input port 32, and the second input port 35 and the third output port 36 are blocked from each other by the spool 31.

When these ranges are set, therefore, the initial application pressure (or the range pressure) is outputted from the manual valve 30 only to the B1 control valve 70. As the voltage to be applied to the linear solenoid valve 65 is lowered to raise the signal pressure gradually, the regulation pressure level at the B1 control valve 70 gradually rises so that the oil pressure to be outputted from the output port 76, i.e., the oil pressure to be fed to the brake B1 gradually rises to apply the brake B1. When the brake B1 is applied, the ring gear 5 of the planetary gear mechanism 3 is fixed. If the engine 1 is driven in this state to rotate the sun gear 4, the carrier 8 and the motor/generator 2 connected thereto are forcibly rotated backward. As a result, the motor/generator 2 functions as the electric generator so that the (not-shown) battery can be charged.

In this case, the signal pressure is also applied from the linear solenoid valve 65 to the signal pressure port 64 of the C2 control valve 60, but the first output port 33 of the manual valve 30, as connected with the C2 control valve 60, is blocked from the input port 32 and does not output the initial application pressure, so that the second clutch C2 is not applied. Nor is fed the initial application pressure to the first clutch C1 so that this clutch C1 is not applied. In other words, even if the control valves 50 and 60 for controlling the application pressures of those clutches C1 and C2 should fail or should stick to output their oil pressures, they are not applied so that no torque is generated at the output shaft 10. In short, even in the stop range, it is possible to prevent such a trouble in advance as might otherwise cause the vehicle to run.

Next, here will be described the case in which the reverse (R) range is selected. When this range is selected, the spool 31 of the manual valve 30 is moved to the position corresponding to that range so that the input port 32 is opened to the second output port 34 whereas the second input port 35 is opened to the third output port 36. In this case, the first output port 33 is blocked from the input port 32.

In the reverse (R) range, therefore, the oil pressures are outputted from the second output port 34 and the third output port 36 of the manual valve 30. Then, the brake B1 can be applied as in the aforementioned stop range by the oil pressure outputted from the second output port 34. On the other hand, the initial application pressure, as outputted from the third output port 36, is fed to the other input port 42 of the shuttle valve 40, from which it is fed via the output port 43 to the input port 51 of the C1 control valve 50. If the solenoid valve 55 is duty-controlled to output the signal pressure, therefore, this signal pressure is applied to the signal pressure port of the C1 control valve 50, so that the C1 control valve 50 regulates the pressure with the regulation pressure level according to the signal pressure thereby to apply the first clutch C1.

Thus, the first clutch C1 and the brake B1 can be applied to set the motor drive mode or the friction running mode in the reverse (R) range. In this case, moreover, the first output port 33 of the manual valve 30 for feeding the initial application pressure to the second clutch C2 is blocked from the input port 32 to output no oil pressure so that the second clutch C2 is not applied even if the C2 control valve 60 fails. In short, it is possible to prevent the failure in advance from causing the forward running state or the locked state to stop the rotation of the output shaft 10, despite in the reverse running range.

Here will be further described the case in which the drive (D) range or the brake (B) range for the forward run is selected. When this range is selected, the spool 31 of the manual valve 30 is moved to the position corresponding to that range, so that the input port 32 is opened only to the first output port 33 whereas the second input port 35 is blocked from the input port 32.

In these forward running ranges, therefore, the oil pressure is outputted only from the first output port 33 of the manual valve 30. As a result, the oil pressure is fed to the input port 61 of the C2 control valve 60 and further to the input port 51 of the C1 control valve 50 through the shuttle valve 40. As the voltage to be applied to the linear solenoid valve 65 is lowered to raise the signal pressure gradually, therefore, the pressure regulation level at the C2 control valve 60 rises gradually so that the oil pressure to be outputted from the output port 66, i.e., the oil pressure to be fed to the second clutch C2 rises gradually to apply the second clutch C2. If the solenoid valve 55 is duty-controlled to output the signal pressure as in the aforementioned reverse (R) range, on the other hand, the signal pressure is applied to the signal pressure port 54 of the C1 control valve 50 so that this C1 control valve 50 regulates the pressure to the pressure regulation level according to that signal pressure thereby to apply the first clutch C1. On the other hand, the applications/releases of these clutches C1 and C2 can be controlled by the corresponding control valves 50 and 60 so that the ETC mode, the direct-coupled mode and the motor drive mode, as tabulated in FIG. 3, can be set.

In this case, moreover, the second output port 34 of the manual valve 30 for feeding the initial application pressure to the brake B1 is blocked from the input port 32 to output no oil pressure, so that the brake B1 is not applied even if the B1 control valve 70 fails. In short, even in the forward running range, it is possible to prevent the failure in advance from causing the backward running state or the locked state in which the rotation of the output shaft 10 is stopped.

Here, the foregoing specific embodiments are constructed such that the application pressures of the brake and the clutches are controlled by the control valves having the pressure regulating functions. However, the invention should not be limited to those specific embodiments but can be modified, if necessary, into suitable constructions having ON/OFF selector valves or a combination of these selector valves and the pressure regulator valves. In the specific embodiments, on the other hand, one set set of planetary gear mechanism is employed as the gear mechanism for coupling the engine and the motor/generator. In short, however, the gear mechanism of the invention may be able to couple a plurality of power sources and to output the output torques of the power sources to the output members, so that it should not be limited to the aforementioned construction. Moreover, the range switching valve of the invention should not be limited to the manual valve shown in FIG. 1. In short, the switching valve may be so constructed as to block the oil pressure from the engagement element to establish the drive state contradictory to the set range.

Here will be synthetically described the advantages to be obtained in the invention. According to the invention, as has been described, the engagement elements are fed with the initial application pressure in accordance with the range, as set, so that they are applied. When one power source is to be driven by another in the stop range, the engagement elements are so applied as to transmit the torque between those power sources. At this time, even if any trouble occurs in the feed line of the hydraulic pressure to the engagement element which will generate, if applied, the torque at the output member to invite the situation in which the hydraulic pressure is applied to said engagement element, the output of the initial pressure for the application to the troubled engagement element is blocked by the range switching valve for outputting the initial pressure, so that the engagement element is kept in the released state. In short, it is possible to prevent it in advance that the torque is generated at the output member to move the vehicle despite that the stop range is set, thereby to establish the so-called "fail-safe".

According to the invention, on the other hand, the forward running state is established when the first engagement element is applied, and the reverse state is held when both the first engagement element and the second engagement element are applied, so that the drive state is reversed depending upon whether or not the second engagement element is applied. With the forward range is selected, the range switching valve closes the output port leading to the second engagement element but opens the output port leading to the first engagement element. In the forward running range, therefore, the feed of the hydraulic pressure to the second engagement element is prevented by the range switching valve for controlling the feed of the initial pressure. As a result, it is possible to prevent it in advance that the reverse state is established despite that the forward running range is selected, thereby to establish the fail-safe.

According to the invention, moreover, with the drive range being selected, the first engagement element is applied so that the torque can be applied to the output member to effect the forward run or the backward run. With the stop range being selected, the output port leading to the first engagement element in the range switching valve is closed to open the first engagement element, but the output port leading to the second engagement element is opened to apply the second engagement element. As a result, the torque of the internal combustion engine can be transmitted to the electric generator to generate the electric power. In short, the vehicle can be reliably prevented from running even if the internal combustion engine is activated while generating the electric power, thereby to establish the fail-safe.

According to the invention, moreover, the forward running state is established by applying the first engagement element, and the backward running state is established by applying the first engagement element and the second engagement element. When the reverse range is selected, however, the first engagement element is fed via another port of the range switching valve with a portion of the hydraulic pressure to be fed from the range switching valve to the second engagement element. In the reverse range, specifically, the hydraulic pressure is not fed to the first engagement element before there is established the feed state of the hydraulic pressure for applying the second engagement element. The reverse range does not come into the feed state of the hydraulic pressure for establishing the forward running state, thereby to establish the fail-safe.

What is claimed is:

1. A control system for a hybrid drive unit, which has: a gear mechanism having different rotary members connected to a plurality of power sources; and a plurality of engagement elements adapted to be applied by a hydraulic pressure for coupling the rotary members to each other in said gear mechanism and for stopping rotations of a predetermined rotary member, wherein in accordance with applied/released states of said engagement elements, there can be set: a forward running range for a forward run by transmitting an input torque to an output member; a backward running range for a backward run by transmitting an input torque to the output member; and a stop range capable of driving one of the power sources by the other power source, comprising:

a range switching valve activated in response to the individual set ranges for switching and outputting an initial pressure for applying said engagement elements, to a plurality of passages, and adapted, when the stop range is set, to output a hydraulic pressure to the first engagement element for establishing a torque transmission line from one of said power sources to the other power source and to block the feed of the initial pressure to the second engagement element for establishing, when applied, the torque at said output member.

2. A control system according to claim 1, further comprising:

a signal pressure valve adapted to be electrically controlled for outputting a signal pressure selectively; and a control valve arranged between said range switching valve and said first engagement element and adapted to be activated according to the applied state of said signal pressure, for outputting said hydraulic pressure selectively to said first engagement element.

3. A control system according to claim 2, wherein said signal pressure valve includes a valve for stopping the output of the signal pressure, when fed with an electric signal, and for outputting the signal pressure when the electric signal is blocked, and wherein said control valve includes a valve adapted, when said signal pressure is applied, to come into a state where said control valve outputs said hydraulic pressure to said first engagement element.

4. A control system for a hybrid drive unit, in which torques outputted by an internal combustion engine and an electric motor are selectively transmitted in accordance with a selected one of a forward running range, a stop range and a backward running range through a planetary gear mechanism to an output member, comprising:

a first engagement element adapted to be applied by a hydraulic pressure for establishing a forward running state by coupling rotary elements of said planetary gear mechanism or said rotary elements and another member;

a second engagement element adapted to be applied by said hydraulic pressure with said first engagement element being applied, for establishing a reverse running state by coupling the rotary elements of said planetary gear mechanism or said rotary elements and said another member a third engagement element adapted to be applied by said hydraulic pressure for coupling one of the rotary elements of said planetary gear mechanism to said another member, when the stop range is selected; and a range switching valve adapted to be activated in response to each of said ranges and including a plurality of output ports leading to all of the engagement elements for outputting the initial pressure of said hydraulic pressure in accordance with the range selected, and for opening the output port leading to said first engagement element and closing the output port leading to said second engagement element, when said forward running range is selected.

5. A control system according to claim 4, further comprising:

a control valve arranged between said range switching valve and said first engagement element for outputting the hydraulic pressure according to an electrically controlled signal pressure, to said first engagement element.

6. A control system according to claim 5, wherein said first engagement element includes a first clutch and a second clutch, and wherein said control valve includes: a first control valve element for controlling the hydraulic pressure to be fed to said first clutch, and for coming into the state where the control valve feeds the hydraulic pressure to said first clutch when the signal pressure is not generated; and a second control valve element for controlling the hydraulic pressure to be fed to said second clutch, and for blocking the hydraulic pressure to said second clutch when the signal pressure is not generated.

7. A control system for a hybrid drive unit, in which an internal combustion engine is connected to any of three rotary elements constructing a planetary gear mechanism whereas an electric generator is connected to another of said rotary elements, so that the torque is selectively outputted in accordance with a selected one of a forward running range, a stop range and a backward running range, through said planetary gear mechanism to an output member, comprising:

a first engagement element adapted to be applied by a hydraulic pressure for connecting said output member and any of the rotary elements of said planetary gear mechanism;

a second engagement element adapted to be applied by a hydraulic pressure for bring the torque of said internal combustion engine into a state where the torque can be transmitted to said electric generator; and a range switching valve adapted to be activated in response to each of said ranges and including a plurality of output ports for outputting the initial pressure of said hydraulic pressure in accordance with the range selected, and for closing the output port leading to said first engagement element and opening the output port leading to said second engagement element, when said stop range is selected.

8. A control system according to claim 7, further comprising:

a signal pressure valve adapted to be electrically controlled for outputting a signal pressure selectively; and a control valve arranged between said range switching valve and said second engagement element and adapted to be activated according to the applied state of said signal pressure, for outputting said hydraulic pressure selectively to said second engagement element.

9. A control system according to claim 8, wherein said signal pressure valve includes a valve for stopping the output of the signal pressure, when fed with an electric signal, and for outputting the signal pressure when the electric signal is blocked, and wherein said control valve includes a valve adapted, when said signal pressure is applied, to come into a state where the control valve outputs said hydraulic pressure to said second engagement element.

10. A control system for a hybrid drive unit, in which torques outputted by an internal combustion engine and an electric motor are selectively transmitted in accordance with a selected one of a forward running range, a stop range and a backward running range through a planetary gear mechanism to an output member, comprising:

a first engagement element adapted to be applied by a hydraulic pressure for establishing a forward running state by coupling rotary elements of said planetary gear mechanism or said rotary elements and another member;

a second engagement element adapted to be applied by the hydraulic pressure with said first engagement element being applied, for establishing a reverse running state by coupling the rotary elements of said planetary gear mechanism or said rotary elements and said another member; and a range switching valve adapted to be activated in response to each of said ranges for outputting an initial pressure of said hydraulic pressure and for closing a predetermined output port leading to said first engagement element when the backward running range is selected, opening a port for outputting the hydraulic pressure to said second engagement element, and opening another port for feeding a portion of the hydraulic pressure, as outputted from said port, to said first engagement element.

11. A control system according to claim 10, further comprising:

a first signal pressure valve adapted to be electrically controlled for outputting a first signal pressure selectively;

a second signal pressure valve adapted to be electrically controlled for outputting a second signal pressure selectively;

a first control valve arranged between said range switching valve and said first engagement element and adapted to act in accordance with an applied state of said first signal pressure for outputting said hydraulic pressure selectively to said first engagement element; and a second control valve arranged between said range switching valve and said second engagement element and adapted to act in accordance with an applied state of said second signal pressure for outputting said hydraulic pressure selectively to said second engagement element.

12. A control system according to claim 11, wherein said first signal pressure valve includes a first signal pressure valve element for stopping the output of the first signal pressure, when an electric signal is inputted, and for outputting the first signal pressure when the electric signal is blocked, wherein said second signal pressure valve includes a second signal pressure valve element for outputting the second signal pressure, when an electric signal is inputted, and for blocking the output of the second signal pressure when the electric signal is blocked, wherein said first control valve includes a first control valve element for coming into the state where the first control valve outputs said hydraulic pressure to said first engagement element when said first signal pressure is applied, and wherein said second control valve includes a second control valve element for coming into the state where the second control valve outputs said hydraulic pressure to said second engagement element when said second signal pressure is applied.

\* \* \* \* \*